United States Patent
Lee

(10) Patent No.: US 6,469,088 B1
(45) Date of Patent: Oct. 22, 2002

(54) POLYOLEFIN INSULATION COMPOSITIONS HAVING IMPROVED OXIDATIVE STABILITY

(75) Inventor: Chun D. Lee, Cincinnati, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 09/704,932

(22) Filed: Nov. 2, 2000

(51) Int. Cl.$^7$ ................................................. C08K 3/34
(52) U.S. Cl. ....................... 524/451; 524/223; 524/224; 524/194
(58) Field of Search ................................ 524/194, 223, 524/224, 451

(56) References Cited

U.S. PATENT DOCUMENTS

| | | | |
|---|---|---|---|
| 3,310,575 A | 3/1967 | Spivack | 524/132 |
| 3,644,482 A | 2/1972 | Dexter et al. | 524/291 |
| 3,660,438 A | 5/1972 | Dexter | 524/194 |
| 3,773,722 A | 11/1973 | Dexter | 524/194 |
| 4,163,006 A * | 7/1979 | Spivack | 524/393 |
| 4,375,531 A | 3/1983 | Ross | 525/93 |
| 4,703,073 A * | 10/1987 | Winter et al. | 524/291 |
| 4,778,840 A | 10/1988 | Linhart et al. | 524/131 |
| 4,812,500 A | 3/1989 | Hayden | 524/191 |
| 5,043,371 A * | 8/1991 | Nakano et al. | 524/94 |
| 5,134,183 A * | 7/1992 | Pastor et al. | 524/236 |
| 5,147,935 A | 9/1992 | Volmer | 524/152 |
| 5,216,054 A * | 6/1993 | Iwanami et al. | 524/194 |
| 5,300,573 A * | 4/1994 | Patel | 525/176 |
| 5,362,783 A * | 11/1994 | Eifller et al. | 524/291 |
| 5,380,591 A | 1/1995 | Keogh et al. | 428/379 |
| 5,575,952 A | 11/1996 | Keogh et al. | 252/404 |
| 5,889,100 A * | 3/1999 | Asai et al. | 524/451 |
| 6,147,146 A * | 11/2000 | Horio et al. | 524/223 |
| 6,231,804 B1 * | 5/2001 | Yamauchi et al. | 526/127 |
| 6,313,225 B2 * | 11/2001 | Saito et al. | 525/322 |

FOREIGN PATENT DOCUMENTS

| | | |
|---|---|---|
| EP | 0 033 660 A2 | 9/1989 |
| EP | 0 382 559 A2 | 8/1990 |
| EP | 0 565 868 A2 | 10/1993 |
| EP | 0 680 999 A1 | 11/1995 |
| EP | 0 777 728 A1 | 5/1997 |
| JP | 9092004 | 4/1997 |

OTHER PUBLICATIONS

*Plastics Additives Handbook*: "Stabilizers, Processing Aids, Plasticizers, Fillers, Reinforcements, Colorants for Thermoplastics," pp. 75–94, edited by Gachter and H. Mueller; Hanser Publishers (1987).
Brown, G.D.: "Performance of HDPE Insulation Antioxidants in Filled Telephone Cable Applications," *International Wire & Cable Symposium Proceedings*, pp. 337–343 (1987).
Ross, J.F., et al.: *Ind. Eng. Chem. Prod. Res. Dev.*: "An Improved Gas–Phase Polypropylene Process," (1985) 24: 194–154.
Wild, L., et al.: "Development of High Performance TREF for Polyolefin Analysis," *Proceeding of Am. Chem. Soc. Div. of Polym. Mat. Sci. and Eng.*, 67:153–154.
Tochaeck, J., et al.: "Metal–Containing Phenolic Antioxidants—Physical Behaviour and Efficiency of Stabilisation in Polypropylene," *Polymer Degradation and Stability* 27: 297–307 (1990).
Ciba–Geigy brochure: IRGANOX MD 1024: Metal Deactivator/Antioxidant, 7 pages.
Chan, M.G., et al.; "Copper Deactivators for Polyolefin Insulation" *Proceedings of 27th International Wire and Cable Symposium*: pp. 99–106

* cited by examiner

*Primary Examiner*—Peter Szekely
(74) *Attorney, Agent, or Firm*—Gerald A. Baracka; William A. Heidrich

(57) ABSTRACT

Improved stabilizer compositions which impart superior oxidative stability to polyolefins used for wire and cable insulation are provided. The stabilizer compositions are a mixture of a diacyl hydrazine compound and an alkylenebisacylamide compound. The stabilizer combinations are particularly useful for propylene polymer insulation compositions used in filled cable constructions. Polyolefin compositions stabilized with the stabilizer combinations of the invention and jacketed constructions utilizing same are also disclosed.

11 Claims, No Drawings

POLYOLEFIN INSULATION COMPOSITIONS HAVING IMPROVED OXIDATIVE STABILITY

BACKGROUND OF THE INVENTION

1. Field of the Invention

The present invention relates to stabilizer mixtures, improved polyolefin compositions stabilized with said stabilizer mixtures and to articles of manufacture utilizing same. The stabilizer compositions are a mixture of a diacyl hydrazine compound wherein one or both of the acyl moieties contain a hindered phenolic substitutent and an alkylenebisacylamide wherein one or both of the acyl moieties contain a hindered phenolic substituent. These stabilizer combinations provide improved oxidative stability for polyolefins and particularly for polyolefin insulation utilized in applications where the insulation will be in contact with water-blocking fillers

2. Description of the Invention

Polyolefin resins, especially polyethylene and polypropylene, are widely used as primary insulation materials for wire. For example, telephone "singles" are produced by extrusion coating 19, 22, 24 or 26 AWG copper wire with solid and/or foamed resin. For the construction of telecommunication cables, these singles are uniformly twisted into pairs and up to 50 or more of these pairs are then typically bundled in a metallic or plastic sheath.

While the outer sheath or jacket provides mechanical protection for the individually insulated conductors, significant deterioration of the insulation, which ultimately results in cracking and necessitates replacement of the cable, has been observed in certain installations. Environmental factors, primarily moisture, heat, light, oxygen and physical stress, are known to accelerate this deterioration. Stabilizers have been used to inhibit deterioration caused by these factors.

Combinations of primary antioxidants and metal deactivators have been used to protect polyolefin compositions used to insulate copper conductors against thermooxidative degradation. Commercially, a combination of pentaerythrityl tetrakis(3-(3',5'-di-t-butyl-4'-hydroxyphenyl)propionate) and N,N'-bis(3-(3',5'-di-t-butyl-4'-hydroxyphenyl)propionyl hydrazine has been demonstrated to be effective. A discussion of primary antioxidant/metal deactivator combinations can be found in Chapter 2 of the *Plastics Additive Handbook*, edited by R. Gachter and H. Muieller, Hanser Publishers (1987), and in an article by G. D. Brown, *International Wire and Cable Symposium Proceedings* 1987, pp. 337–343.

A second type of degradation, referred to as "treeing," is caused by moisture. To minimize the risk of water penetration, the jacket or sheath encasing the bundled insulated wires is filled with a water-blocking filler grease. These filler grease compounds, usually hydrocarbons of a heavy oil or waxy consistency, are forced under pressure into the cable to fill the voids and interstices therein. While these cable fillers have generally proven to be effective water-blocks, they have a tendency to extract the stabilizer(s). Thus, while the oxidative stability of the insulation may initially be adequate, after exposure to the water-blocking agent there is a significant decrease in the stabilizer protection which can lead to premature catastrophic failure. In one study comparing the stability of solid and cellular polyethylene insulation with and without contact with hydrocarbon filler reported at pages 85 and 86 of the above-referenced text of Gächter and Muieller, it was found that aging in the presence of petrolatum reduces the stability of solid polyethylene by 35 percent and of cellular polyethylene by 10–40 percent.

The choice of stabilizer is therefore even more critical where the insulated conductor is used in conjunction with a water-blocking cable filler. After evaluating numerous primary antioxidant/metal deactivator combinations in polyethylene, Brown in his above-referenced article reports he was unable to identify a cost effective primary antioxidant - alternative to pentaerythrityltetrakis(3-(3',5'-di-t-butyl-4'-hydroxyphenyl)propionate) providing good melt processing stabilization and improved performance after cable filler exposure. Keogh, et al., in U.S. Pat. Nos. 5,380,591 and 5,575,952 utilize a mixture of one or more alkylhydroxyphenylalkanoyl hydrazines and one or more functionalized hindered amines as stabilizers to provide polyolefin insulation compositions which are resistant to extraction and premature degradation.

It would be highly advantageous if an improved stabilizer formulation were available which provided superior oxidative stability upon exposure to water-blocking grease fillers. It would be even more advantageous if the components of the stabilizer package were readily available. These and other advantages are provided by the formations of the present invention which will be described in more detail to follow.

SUMMARY OF THE INVENTION

The improved stabilizer compositions of the invention which provide superior oxidative stability when incorporated in polyolefin insulation compositions exposed to water-blocking fillers comprise a mixture of (a) a diacyl hydrazine compound wherein one or both of the acyl moieties contain a hindered phenolic substitutent and (b) an alkylenebisacylamide compound wherein one or both of the acyl moieties contain a hindered phenolic substituent, (a) and (b) respectively present in a weight ratio from about 1:1 to 8:1. The diacyl hydrazine compound has the formula

wherein R is a $C_{1-10}$ alkylene group, A is a hindered phenolic substituent corresponding to the formula

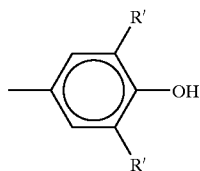

wherein R' is a $C_{1-8}$ alkyl group and B is hydrogen or A and, in a preferred embodiment, is N,N'-bis(3-(3',5'-di-t-butyl-4'-hydroxyphenyl)propionyl)hydrazine. The alkylenebisacylamide compound has the formula

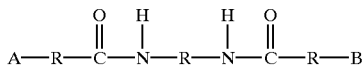

where AB and R are the same as defined for the diacyl hyrazine compound and, in a preferred embodiment is N,N'-hexamethylenebis(3,5-di-t-butyl-4-hydroxyhydrocinnamide). The stabilizers of the invention are preferably employed with propylene polymers containing both amorphous and crystalline phases. Propylene polymers of this type can be either reactor-made or post-reactor produced blends of polypropylene homopolymer and ethylene-propylene copolymers. The diacyl hydrazine compound will constitute from 0.1 to 1.0 percent of the total composition and the alkylenebisacylamide compound will constitute from 0.05 to 0.8 percent of the total composition. Highly effective propylene polymer insulation compositions can additionally contain 5 to 20 percent high density polyethylene, 0.1 to 1 percent small particle size talc and 0.005 to 0.1 percent organic peroxide. Propylene polymer compositions formulated in accordance with the invention are particularly effective primary insulation for 20–26 AWG copper wire coated to a thickness of 7–15 mil and maintained in contact with a hydrocarbon filler grease within a jacketed assembly.

DETAILED DESCRIPTION

Stabilizer combinations utilized for the present invention are mixtures of diacyl hydrazine compounds wherein one or both of the acyl moieties contains a hindered phenolic substitutent and alkylenebisacylamides wherein one or both of the acyl moieties contains a hindered phenolic substituent. These stabilizer combinations are useful with a wide variety of polyolefins used for primary insulation and jacketing applications to improve oxidative stability. These polyolefins include α-olefin homopolymers, copolymers and blends obtained by conventional polymerization methods known to the art. The stabilizer mixtures of the invention are particularly useful with polyethylene (PE) and polypropylene (PP).

As utilized herein, the terms polyethylene and polypropylene are intended to encompass both homopolymers and copolymers of ethylene and propylene, respectively. All percentages and ratios referred to herein are on a weight basis unless otherwise indicated. Percentages of components are given on a weight basis, based on the total weight of the composition.

Useful polyolefin compositions of the invention are formulated using polyethylene resins having densities in the range from about 0.92 g/cm$^3$ up to about 0.96 g/cm$^3$ including both ethylene homopolymers and copolymers of the ethylene with α-olefins having from 3 up to about 8 carbon atoms. Ethylene copolymers wherein the comonomer is propylene, butene-1, hexene-1 or octene-1 are especially advantageous and include, linear low density polyethylene (LLDPE), medium density and polyethylene and high density polyethylene (HDPE).

The polyethylene resins can have a melt index (MI) ranging from about 0.01 up to 30 g/10 min or more; however, for insulation, i.e., wire coating applications, melt indexes generally range from about 0.1 up to about 5 g/10 min. In one embodiment of this invention, polyethylene resins having densities ranging from about 0.935 up to about 0.957 g/cm$^3$ and melt indexes of about 0.1 up to about 2 g/10 min are employed. In another embodiment, HDPE resins obtained by copolymerizing ethylene with minor amounts of butene-1 or hexene-1 are used by themselves or with propylene polymers. Densities and melt indexes/melt flow rates (MFR) referred to herein are determined in accordance with ASTM Test Methods D 1505 and D 1238, respectively.

The improved stabilizer mixtures of the invention are particularly well suited for use in compositions containing propylene polymers. Whereas crystalline, i.e., isotactic, polypropylene homopolymers can be used, for most insulation applications and particularly for telephone cable installations, polymers containing both propylene and ethylene produced in either a single reactor, multiple reactors or by physical blending are preferred. These polymers will generally have propylene as the major, i.e., predominant, monomer constituent. Effective stabilization of these polymers is achieved using relatively low levels of the additives of the invention.

Poly(propylene-ethylene) copolymers produced in a single polymerization reactor can be used; however, blends of crystalline isotactic polypropylene homopolymer with high molecular weight amorphous or semi-crystalline ethylene-propylene (EP) copolymers are particularly useful. Isotacticity of the polypropylene will generally be 80 percent or greater.

Propylene polymers containing both amorphous and crystalline phases can be directly synthesized, i.e., reactor-made, or obtained by post-reactor blending two or more polymers obtained from different polymerization processes. In either case, the amorphous ethylene-propylene copolymer component should have a molecular weight above specified limits, as determined by Theological means. The crystalline PP homopolymer will typically have a melt flow rate from 0.1 to 10 g/10 min and 80 to 98 percent isotacticity. When directly synthesized, i.e., reactor-made, the EP copolymer will have a log dynamic complex viscosity ($\eta^*$) measured at 0.1 rad/sec and 210° C. of 5.7 or above whereas, when post-reactor blended by physically mixing an EP copolymer with a PP homopolymer, the EP copolymer will have a log dynamic complex viscosity at 0.1 rad/sec and 210° C. of 5.3 or above. All reference to log dynamic complex viscosity herein is to the base 10 (as opposed to the natural log). The ratio of PP to E/P will range from 9:1 to 0.15:1 and, more preferably, will be from 5:1 to 1:1.

Reactor-made base resins which are intimate mixtures of PP homopolymer and amorphous or semi-crystalline EP copolymer are produced utilizing known technology wherein the polymerizations, preferably gas-phase, are carried out in dual reactors connected in series. The use of dual or cascading reactors for the copolymerization of propylene and ethylene to produce impact copolymers is known (see Ross U.S. Pat. No. 4,375,531). Gas-phase polymerizations utilizing stirred, fixed beds comprised of small polymer particles are also known. For additional information regarding gas-phase polymerizations and a schematic flow diagram of the process, see the article by Ross, et al., in *Ind. Eng. Chem. Prod. Res. Dev.*, 1985, 24: 194-154. Whereas it is most advantageous to conduct both polymerizations in the gas phase, either the first or second reactor may be operated in a mode other than gas phase.

In a first reactor, propylene is homopolymerized typically at a temperature from 50° C. to 100° C. and pressure from 250 psig to 650 psig utilizing a titanium catalyst and an organoaluminum cocatalyst. More preferably, the temperature in the first reactor will be from 50° C. to 90° C. and the pressure will range from 300 psig to 450 psig. The highly isotactic PP homopolymer produced in the first reactor is directly fed to a second reactor maintained at 25° C. to 80° C. and 100 psig to 500 psig where propylene and ethylene are copolymerized in the presence of the homopolymer. An amount of ethylene is employed in the second reactor to produce an EP copolymer with rubber-like characteristics and ethylene content from 20 to 65 percent. EP copolymers having ethylene contents from 25 to 60 percent are particularly advantageous. Polymerization in:the second reactor is generally accomplished without additional catalyst; however, it may be advantageous to introduce more catalyst to the second reactor. If more catalyst is employed, it can be the same or different catalyst used in the first polymerization. Preferably, the second polymerization reactor is operated at 40° C. to 70° C. and 100 psig to 350 psig.

Reactor-made products produced in the above-described manner are intimate mixtures of the highly isotactic PP homopolymer and amorphous or semi-crystalline EP copolymer. Ethylene contents of the reactor-made intimate mixtures can range from 20 weight percent up to 65 percent. More typically, the amount of ethylene will be from 25 to 60 percent. If desired, other alpha-olefins containing from 4 to 8 carbon atoms can be included in the polymerization and incorporated. Butene-1, hexene-1 and octene-1 are useful comonomers for this purpose.

In an alternate embodiment, the propylene polymers may be obtained by post-reactor blending. This is accomplished by physically blending a PP homopolymer and an EP copolymer rubber (EPR) produced in separate polymerization reactors. The PP and EPR are subsequently combined and blended, such as by melt blending in a Banbury mixer, extruder mixer or the like, to obtain a homogeneous blend. PP and EPRs employed for post-reactor blends obtained in this manner are commercially available resins produced using conventional polymerization procedures. The amount of PP and EPR copolymer used to, obtain post-reactor blends useful for the invention will vary depending on the characteristics of the individual polymers, i.e., isotacticity of the PP and rubbery character of the EP copolymer which is a function of the ethylene content of the copolymer. Useful EPRs for the formation of post-reactor blends will have ethylene contents from 40 to 85 percent and, more preferably, from 50 to 80 percent.

When polyolefins of the type described above are stabilized using a mixture of two specific hindered phenolic stabilizers in accordance with the invention, markedly improved oxidative stability is observed. It is particularly significant that the stabilizer combinations of the invention impart improved oxidative stability to polyolefin insulation formulations contacted with grease fillers in wire and cable applications. The improved stabilizer compositions of the invention are a mixture of (a) a diacyl hydrazine compound wherein one or, more preferably, both of the acyl moieties contain a hindered phenolic substituent and (b) an alkylenebisacylamide wherein one or, more preferably, both of the acyl moieties contain a hindered phenolic substituent typically utilized in a ratio of (a):(b) from about 1:1 to 8:1 and, more preferably, from 1.25:1 to 4:1.

The two stabilizers may be combined before being added to the polymer resin or they may be separately added to the polyolefin. The stabilized polymer formulations can be produced in a number of ways provided the hindered phenolic stabilizer components and other additives are uniformly distributed throughout the polyolefin. The ingredients may be either dry blended or melt blended with the resin. Dry blending can be accomplished using a Henschel mixer or cone blender. The additives may also be added to a polymer melt and dispersed therein using an internal mixer such as a Banbury mixer, Farrel continuous mixer or a single or twin screw extruder. Alternatively, the hindered phenolic compounds and other additives may be mixed into a suitable carrier resin or liquid, e.g., silicon oil, to form a masterbatch and the masterbatch added to the polyolefin. Carrier resins used for this purpose may be the same Qr different than the polyolefin used for the insulation. If the carrier resin is different, it should be compatible with the insulation resin. If masterbatch techniques are used, the masterbatch may contain as much as 50 percent or more of the stabilizers and other additive(s).

The two stabilizer components of the invention are both hindered phenolic compounds. The diacyl hydrazine compound (a) corresponds to the general formula

wherein R is a $C_{1-10}$ alkylene group, A is a hindered phenolic group of formula

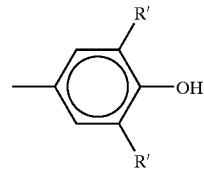

wherein R' is $C_{1-8}$ alkyl, and B is hydrogen or A. The alkylene groups (R) may be the same or different and the R' groups may be the same or different. Compounds of this type are known antioxidants/metal deactivators and have been used as stabilizers to extend the useful life of PP, HDPE, LDPE and certain elastomers utilized as primary insulation in contact with copper conductors. They are known to exhibit a high level of extraction resistance in certain polymers and are recommended for use with certain phenolic or aminic antioxidants.

Especially useful diacyl hydrazine compounds are those wherein R is an alkylene group having from 2 to 6 carbon atoms and A and B are both hindered phenol groups where R' is a $C_{1-4}$ alkyl group. In a particularly useful embodiment of the invention, the diacyl hydrazine compound is N,N'-bis(3-(3',5'-di-t-butyl-4'-hydroxyphenyl)propionyl) hydrazine having the structural formula

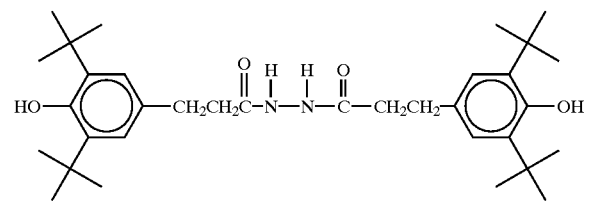

where "+" represents a t-butyl group. This compound is commercially available under the tradename IRGANOX MD- 1024.

The alkylenebisacylamide compound (b) has the general formula

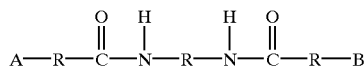

wherein A, B and R are the same as defined above. In a preferred embodiment of the invention, A and B are both hindered phenolic groups, R' is a $C_{1-4}$ alkyl group and R is a $C_{2-6}$ alkylene group. In an even more preferred embodiment, the alkylenebisacylamide is N,N'-hexamethylenebis(3,5-di-t-butyl-4-hydroxyhydrocinnamide) having the structural formula:

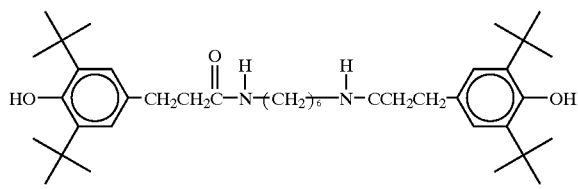

where "+" represents a t-butyl group. This compound is commercially available under the tradename IRGANOX 1098.

Other conventional additives can also be present with the stabilizers in the formulated primary insulation compositions of the invention. The additives may include other antioxidants, synergists, UV stabilizers, processing aids, nucleating agents, filling agents, foaming agents, colorants, pigments, metal deactivators, cross-linking agents and the like. Such additives are known in the art and are generally present at low levels. Additives can be incorporated into the polymer with the stabilizers or added separately.

In one highly useful embodiment of the invention, a small amount of organic peroxide is included when formulating the stabilized insulation compositions. Up to 0.5 percent peroxide, based on the total weight of the polymer components, can be employed. More commonly, the amount of peroxide ranges from 0.005 to 0.1 percent and, most preferably, from about 0.01 to 0.06 percent. Useful organic peroxides generally have decomposition temperatures less than 230° C. The peroxide may be directly injected into the mixer or extruder when preparing the formulations or it can be physically adsorbed onto the polymer or other inert materials and introduced in this manner.

Any of the known organic peroxides commonly utilized to generate free radicals can be used but it is preferred to utilize peroxides which have negligible decomposition below 120° C. and a half life greater than one minute at 160° C. Suitable peroxides include di-(t-butyl)peroxide, dicumyl peroxide, 2,5-dimethyl-2,5-di(t-butylperoxy)-hexane, 2,5-dimethyl-2,5-di(t-butylperoxy)-hexyne-3, butyl-4,4-bis(t-butyl peroxyvalerate), cumyl hydroperoxide, 1,1-bis-(t-butylperoxy)-3,3,5-trimethylcyclohexane, 1, 3-di-(t-butylperoxy)di-isopropylbenzene, benzoyl peroxide, t-butyl hydroperoxide, t-butyl peroxybenzoate, cumene hydroperoxide, lauroyl peroxide, t-butyl peroxy acetate, t-butyl peroxide methyl ethyl ketone peroxide, t-butyl cumyl peroxide, (t-butylperoxy)-butyrate and the like. A preferred peroxide is 2,5-dimethyl-2,5-di(t-butylperoxy)-hexane. The organic peroxide may be adsorbed on a suitable filler, such as talc or silica, to facilitate introduction. This is particularly advantageous when using in-reactor PP powders. The amount of organic peroxide on the filler may vary but is generally between about 5 and 30 percent. In one embodiment, about 7 to 25 percent of 2,5-dimethyl-2, 5-di(t-butylperoxy)-hexane is adsorbed on silica. Products of the latter type are commercially available under the tradename LUPERCO.

Stabilized compositions useful as primary insulation for wire and cable produced in accordance with the preceding description will generally have melt flow rates from about 1 to 5 g/10 min, more preferably, from 1.5 to 3.5 g/10 min. As a result, they are capable of being extruded at high speeds. They are particularly useful for extrusion coating single or multi-strand wires and cables to provide a uniform 10 to 50 mil thick layer of primary insulation around the wire or cable which can be a metal conductor or fiber optic material. Telephone singles generally have a 7 to 15 mil layer of insulation coated onto 20 to 26 AWG single-strand copper wire. Formulations of the invention also have good melt stability which is essential to eliminate or minimize oscillatory flow at high extrusion speeds. Oscillatory flow results in non-uniform thickness of the insulation around the conductor. Failure to have the conductor consistently positioned at the geometric center of the insulated wire construction can result in decreased signal performance and "crosstalk." Furthermore, those areas where the primary insulation layer is too thin are more prone to pinhole formation and cracking from bending or abrasion. Minimization of eccentricity is particularly advantageous where small diameter wires and/or thin insulation layers are applied, such as for the manufacture of telephone singles.

Polyolefin compositions stabilized using the mixed stabilizer systems of the invention exhibit superior oxidative stability when evaluated using the oxidative induction time (OIT) test in accordance with ASTM D 4565. This procedure which provides a rapid and convenient relative measure of the degree of stabilization of polymeric compositions utilizes thermal analysis to determine oxidative stability. The OIT test measures the time for the onset of oxidation of samples maintained at 200° C. in pure oxygen. Typically, stabilized polyolefin insulation formulations will have OIT values of 200 minutes or greater and, in some instances, as high as 290 minutes. Whereas OIT values above 200 minutes are acceptable and achievable using numerous antioxidant combinations, oxidative stability rapidly decreases to unacceptable levels with formulations containing the prior art stabilizer combinations upon exposure to water-blocking greases. After seven days exposure to water-blocking grease, OIT values can be reduced to less than 30 minutes with prior art compositions. For commercial applications, an OIT value of greater than 40 minutes is generally considered to be necessary after 14 days exposure to grease fillers. With the compositions of the invention, OIT values typically greater than 60 minutes and, in some instances, greater than 100 minutes are possible after 14 days exposure using total stabilizer concentrations of about 1 percent.

In addition to the foregoing, the stabilized insulation compositions of the invention have a good balance of physical properties. For example, representative compositions suitable for wire and cable insulation applications will have densities from about 0.900 g/cm$^3$ and melt flow rates in the range 1 to 5g/10 min. Representative tensile yield strengths and elongations at break can range from 2800 to 3300 psi and 300 to 600 percent, respectively, as determined by ASTM Test Method D 638. Flexural modulus (1% secant; ASTM D 790) and Shore D hardness (ASTM D 2240) can range from 100000 to 140000 psi and 65 to 75, respectively.

Effectively stabilized insulation formulations are obtained when the acyl hydrazine is employed in an amount from 0.1 to 1.0 percent with 0.05 to 0.8 percent of the alkylenebisacylamide. It is even more preferred when the acyl hydrazine and alkylenebisacylamide are present in amounts from 0.25 to 0.75 percent and 0.1 to 0.6 percent, respectively.

In a particularly useful embodiment of the invention, it has been discovered that the inclusion of low levels of talc with the stabilizer mixtures of the invention, particularly small particle size talc, yields products with significantly higher OIT values after grease exposure than is possible using the stabilizer combinations alone. This is totally unexpected in view of the fact that the addition of talc with other heretofore known stabilizer combinations gives little or no increase in OIT upon exposure to water-blocking grease fillers.

While conventional talc grades can be employed, small particle size talcs, sometimes referred to as ultrafine talcs, are preferably employed. Talcs having median diameters less than 2 microns and, most preferably, less than 1 microns are especially useful to achieve optimum oxidative stability with polyolefin formulations exposed to grease fillers. BENWOOD 2202 talc having a median particle size of 1.6 microns is representative of the type of talc products which can be useful and HITALC PREMIUM HTP ULTRA 5C having a median diameter of 0.5 microns is particularly advantageous. Talc levels employed will range from 0.1 to 1 percent and, more preferably, 0.2 to 0.75 percent. While higher levels of talc can be used, they are typically avoided as they adversely affect the insulation dielectric properties.

In another highly useful embodiment, compositions particularly well-suited for primary insulation of telephone singles and similar constructions utilizes a polyolefin compositions comprised of HDPE, a propylene polymer containing both amorphous and crystalline phases, diacyl hydrazine compound, alkylenebisacylamide compound and ultrafine talc. It is especially advantageous when the composition comprises 5 to 20 percent HDPE and 75 to 95 percent reactor-made or post-reactor blend of PP homopolymer and EP copolymer. It is even more advantageous when the HDPE/propylene polymer blends are stabilized with a mixture of N,N'-bis(3-(3', 5'-di-t-butyl-4'-hydroxyphenyl)propionyl)hydrazine and N,N-hexamethylenebis(3, 5-di-t-butyl-4-hydroxyhydrocinnamide) and the talc has a median diameter less than 1 micron.

Compositions of the invention are highly useful for the manufacture of filled cables, such as telephone transmission cables, wherein a plurality of individual conductors insulated with the primary insulation composition of the invention are assembled in a jacket and any interior voids within the assembled cable filled with hydrocarbon grease. Filled cable fabrication techniques are well known to those skilled in the wire and cable arts. A description of the process as well as the types of hydrocarbon grease fillers used is provided in U.S. Pat. No. 5,380,591 which is incorporated herein by reference.

While the compositions are particularly well suited for high-speed extrusion onto wire and cable, they may also be utilized in other extrusion processes such as for foam skin wire and cable applications, manufacture of buffer tubes for fiber optic cables, and the production of mono- or multilayer films. They may be extrusion coated onto various rigid or flexible substrates such as glass, fabric, foil, wood, paper, composite materials and the like. When coextruded they can be applied with one or more other thermoplastic resins or thermoplastic resin blends.

The invention is further described and illustrated by the following examples which are not intended to be limiting. In these examples all parts and percentages are on a weight basis.

EXAMPLE 1

An insulation composition was prepared utilizing an in-reactor produced propylene polymer comprising an intimate mixture of crystalline PP homopolymer with an amorphous random EP copolymer. Since the polymer was obtained as a reactor powder, the PP and EP components of the mixture were isolated in order to characterize the polymers. This was accomplished by fractionating the mixture using temperature rising elution fractionation (TREF), a recognized procedure for separating polymer species based on differences in crystallizability in accordance with the procedure of Wild, et al., (1992), "Development of High Performance TREF for Polyolefin Analysis," Proceeding of Am. Chem. Soc. Div. of Polym. Mat. Sci. and Eng., 67:153.

The PP homopolymer had an isotactivity of 93 percent and MFR of 0.4 g/10 min. The EP rubbery component of the in-reactor intimate mixture had an ethylene content of 56 percent and log dynamic complex viscosity of 5.97. The approximate weight percent of the EP copolymer in the mixture was 23 percent.

The propylene polymer was dry-blended with HDPE (PETROTHENE LR 732 manufactured by Equistar Chemicals, LP; density 0.956 g/cm$^3$; MI 0.2 g/10 min); organic peroxide (LUPERCO 101-P20; 20 percent 2,5-dimethyl-2,5-di(t-butylperoxy)-hexane absorbed on silica); organic nucleating agent (dibenzilidene sorbitol; MILLARD 3905); calcium stearate; N,N'-bis(3-(3',5'-di-t-butyl-4'-hydroxyphenyl)propionyl)hydrazine and N,N-hexamethylenebis(3,5-di-t-butyl-4-hydroxyhydrocinnamamide) and the mixture melt-blended and pelletized using a Leistritz twin screw extruder (1.5 inch screw diameter) configured as follows:

| Zone 1 | 149° C. |
|---|---|
| Zone 2 | 152° C. |
| Zone 3 | 163° C. |
| Zone 4 | 177° C. |
| Zone 5 | 204° C. |
| Zone 6 | 221° C. |
| Zone 7 | 221° C. |
| Zone 8 | 232° C. |
| Zone 9 | 232° C. |
| Die | 232° C. |

The resulting pelletized composition had an MFR of 2–3 g/10 min and compositionally was comprised as follows:

| Propylene Polymer | 88.866% |
|---|---|
| HDPE | 10.0% |
| Organic Peroxide | 0.034% |
| Nucleating Agent | 0.15% |
| Calcium Stearate | 0.05% |
| N,N'-bis(3-(3',5'-di-t-butyl-4'-hydroxy-phenyl)propionyl)hydrazine | 0.50% |
| N,N'-hexamethylenebis(3,5-di-t-butyl-4-hydroxy-hydrocinnamamide) | 0.40% |

The resulting pellets were dry blended with 4 percent of a 50 percent TiO$_2$ white concentrate and this composition was extruded onto 24 AWG copper wire using a Davis Standard single screw extruder (2.5 inch screw diameter; L/D 20:1) fitted with a 0.038 inch double angle die and operating at a line speed of 900 ft/min. The insulation layer was extruded to a uniform thickness of 9 mil. To evaluate oxidative stability of the insulation composition, 8 inch lengths of insulated wire were cut and bent into a U-shape and placed in a test tube containing a commercial filler grease so that the cut ends of the wire sample were outside the test tube. The filler grease was Witco Gel II containing 0.2 percent antioxidant and maintained at 70° C. Volume ratio of the filler compound to insulation of the test specimen was approximately 15:1. Test specimens were removed after 7 and 14 days aging and evaluated for OIT in accordance with ASTM D 4565. The OIT values for the above-prepared composition after 7 and 14 days were 60 minutes and 57 minutes, respectively.

Comparative Example A

To demonstrate the superior oxidative stability of the compositions of the invention, Example I was repeated except that 0.20 percent pentaerythrityltetrakis (3-(3',5'-di-t-butyl-4'-hydroxyphenyl)propionate) (IRGANOX 1010) and 0.20 percent thiodiethylene bis (3,5-di-t-butyl-4-hydroxyhydrocinnamate) (IRGANOX 1035) were substituted for the N,N'-hexamethylenebis(3,5-di-t-butyl-4-hydroxyhydrocinnamamide). IRGANOX 1010 and 1035 are widely used phenolic stabilizers commonly used with polyolefins. When employed in conjunction with N,N'-bis(3-(3',5'-di-t-butyl-4'-hydroxyphenyl)propionyl)hydrazine, these stabilizer combinations were ineffective upon exposure to cable filler grease. The 7 and 14 day OIT values for the comparative composition were only 21 minutes and 22 minutes, respectively.

EXAMPLE 2

To demonstrate the ability to further improve oxidative stability of the compositions of the invention by incorporating low levels of small particle size talc, the following example is provided.

A formulation was prepared as follows:

| | |
|---|---|
| Propylene Polymer | 88.816% |
| HDPE | 10.0% |
| Organic Peroxide | 0.034% |
| Calcium Stearate | 0.05% |
| Diacyl Hydrazine | 0.50% |
| Alkylenebisacylamide | 0.20% |
| Talc | 0.40% |

The talc used was HITALC PREMIUM HTP ULTRA 5C having a median diameter of 0.5 microns. All of the other ingredients and procedures were the same as in Example 1. OIT values obtained after 7 and 14 days aging were 82 minutes and 79 minutes, respectively. This is a further significant increase in oxidative stability, particularly considering the amount of alkylenebisacylamide compound was half that used in Example 1.

EXAMPLE 3

Example 2 was repeated except that the organic peroxide was omitted and 0.01 percent IRGANOX 1010 added. When the composition was processed and tested in accordance with the standard procedures, an OIT value of 96 minutes was obtained after 7 days aging with the hydrocarbon filler grease. An OIT value of 92 minutes was obtained after 14 days aging.

EXAMPLE 4

Example 2 was repeated except that the HDPE was omitted. OIT values after 7 and 14 days aging were 86 and 81 minutes, respectively.

Comparative Examples B and C

To further demonstrate the superior results obtained when an alkylenebisacylamide compound is employed in combination with a diacyl hydrazine compound, two comparative formualtions were prepared wherein commonly used stabilizer components were substituted for the N,N'-hexamethylenebis(3,5-di-t-butyl-4-hydroxyhydrocinnamide). For comparative formulation B., all of the ingredients were the same as in Example 2 except that the alkylenebisacylamide compound was replaced with 0.2 percent pentaerythrityltetrakis(3-(3'-5'-di-t-butyl-4'-hydroxyphenyl)propionate) (IRGANOX 1010) and 0.2 percent polymeric amine stabilizer (CHIMASSORB 2020 FDL). For comparative formulation C, all of the ingredients were the same as in Example 2 except that the alkylenebisacylamide compound was replaced with 0.2 percent pentaerythrityltetrakis(3-(3'-5'-d-t-butyl-4'-hydroxyphenyl)propionate), 0.2 percent polymeric amine stabilizer (CHIMASSORB 2020 FDL) and 0.2 percent thiodiethylene bis (3,5-di-t-butyl-4-hydroxyhydrocinnamate). OIT values obtained for samples prepared and tested using the procedures of Example I were as follows:

| | 7 Day OIT | 14 Day OIT |
|---|---|---|
| Comparative B | 65 minutes | 54 minutes |
| Comparative C | 57 minutes | 50 minutes |

The above results are markedly inferior to those obtained using the stabilizer combination of the invention in Example 2. This is particularly significant in view of the fact that the concentration of the commercial stabilizers substituted for the alkylenebisacylamide used for Comparative B and Comparative C was two and three times the concentration used for Example 2.

EXAMPLES 5–9

A series of insulation compositions were prepared varying the stabilizer mixture and using different talcs. All of the compositions were prepared in accordance with the procedure of Example I and evaluated for oxidative stability after exposure to cable filler grease. Compositional details and OIT results are set forth in Table 1.

TABLE I

| | EXAMPLE NO. | | | | |
|---|---|---|---|---|---|
| | 5 | 6 | 7 | 8 | 9 |
| Propylene Polymer | 88.716 | 88.816 | 88.716 | 88.516 | 88.316 |
| HDPE | 10.0 | 10.0 | 10.0 | 10.0 | 10.0 |
| Organic Peroxide | 0.034 | 0.034 | 0.034 | 0.034 | 0.034 |
| Calcium Stearate | 0.05 | 0.05 | 0.05 | 0.05 | 0.05 |
| Talc[1] | 0.40 | — | — | — | — |
| Talc[2] | — | 0.40 | 0.40 | 0.40 | 0.40 |
| N,N'-bis(3-(3',5'-di-t-butyl-4'-hydroxyphenyl)propionyl)hydrazine | 0.50 | 0.50 | 0.50 | 0.50 | 0.50 |
| N,N'-hexamethylenebis(3,5-di-t-butyl-4-hydroxyhydrocinnamamide) | 0.20 | 0.10 | 0.20 | 0.40 | 0.60 |
| IRGANOX 1010[3] | 0.10 | 0.10 | 0.10 | 0.10 | 0.10 |
| 7 Day OIT (minutes) | 62 | 73 | 85 | 97 | 120 |
| 14 Day OIT (minutes) | 60 | 70 | 83 | 92 | 115 |

[1]BENWOOD 2202 talc; median particle size 1.6 microns
[2]HITALC PREMIUM HTP ULTRA 5C; median diameter 0.50 microns
[3]Pentaerythrityltetrakis(3-(3',5'-di-t-butyl-4'-hydroxyphenyl)propionate)

I claim:

1. A propylene polymer composition having improved oxidative stability upon exposure to water-blocking grease fillers comprising:

(i) a propylene polymer containing amorphous and crystalline phases which is a reactor-made or post-reactor blend of polypropylene homopolymer and ethylene-propylene copolymer;

(ii) a stabilizing effective amount of a stabilizer mixture comprising:

(a) a diacyl hydrazine compound of the formula:

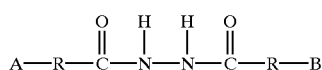

wherein R is a $C_{1-10}$ alkylene group, A is a hindered phenolic substituent corresponding to the formula

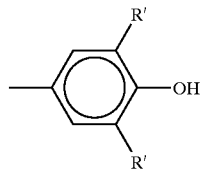

wherein R' is a $C_{1-8}$ alkyl group and B is hydrogen or A and (b) an alkylenebisacylamide compound of the formula

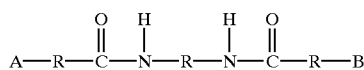

where A, B and R are the same as defined for (a); and (iii) 0.1 to 1 percent based on the weight of the total composition talc having a median diameter less than 1 micron.

2. The propylene polymer composition of claim 1 wherein (a) is present minan amount from 0.1 to 1.0% based on the weight ratio of the total composition and (b) is present in an amount from 0.05 to 0.8% based on the weight of the total composition.

3. The propylene polymer composition of claim 2 wherein (a) is N,N'-bis(3-(3',5'-di-t-butyl-4'-hydroxyphenyl) propionyl)hydrazine.

4. The propylene polymer composition of claim 3 wherein (a) is present in an amount from 0.25 to 0.75% based on the weight of the total composition.

5. The propylene polymer composition of claim 2 wherein (b) is N,N'-hexamethylenebis(3,5-di-t-butyl-4-hydroxyhydrocinnamide).

6. The propylene polymer composition of claim 5 wherein (b) is present in an amount from 0.1 to 0.6% based on the weight of the total composition.

7. The propylene composition of claim 2 which additionally contains from about 5 to 20% based on the weight of the total composition of high density polyethylene having a density from about 0.935 to 0.957 g/cm$^3$ and melt index from about 0.1 to 2 g/10 min.

8. The propylene polymer composition of claim 2 wherein the propylene polymer is a reactor-made blend of crystalline polypropylene homopolymer and ethylene-propylene copolymer containing 20 to 65 weight precent ethylene and wherein the weight ratio of polypropylene to ethylene-propylene copolymer ran ges from 5:1 to 1:1, respectively.

9. The propylene polymer composition of claim 8 which additionally contains 0.005 to 0.1 based on the weight of the total composition of an organic peroxide having a decomposition temperature less then 230° C.

10. The propylene polymer composition of claim 9 wherein the organic peroxide is 2,5-dimethyl-2,5-di(t-butylperoxy)-hexane.

11. The propylene polymer composition of claim 8 wherein (a) is N,N'-bis(3-(3',5'-di-t-butyl-4'-hydroxyphenyl) propionyl)hydrazine, (b) is N,N'-hexamethylenebis(3,5-di-t-butyl-4-hydroxyhydrocinnamide) and additionally containing from about 5 to 20% based on the weight of the total composition of high density polyethylene having a density from about 0.935 to 0.957 g/cm$^3$ and melt index from about 0.1 to about 2 g/10 min and 0.005 to 0.01 percent based on the weight of the total composition of dimethyl-2,5-di(t-butylperoxy) hexane.

* * * * *